United States Patent [19]

Arvidsson et al.

[11] Patent Number: 5,049,445
[45] Date of Patent: Sep. 17, 1991

[54] MASKING TAPE AND METHOD FOR MANUFACTURING ROLLS OF SUCH TAPE

[75] Inventors: Ola Arvidsson, Tjällmo; Magnus Hilleby, Väderstad, both of Sweden

[73] Assignee: Intermall AB, Tjallmo, Sweden

[21] Appl. No.: 285,969

[22] PCT Filed: Mar. 24, 1988

[86] PCT No.: PCT/SE88/00143
§ 371 Date: Nov. 30, 1988
§ 102(e) Date: Nov. 30, 1988

[87] PCT Pub. No.: WO88/07415
PCT Pub. Date: Oct. 6, 1988

[30] Foreign Application Priority Data

Mar. 25, 1987 [SE] Sweden .............................. 8701245-6

[51] Int. Cl.5 .......................... B32B 7/10; B32B 7/12; B29C 53/56
[52] U.S. Cl. ................................... 428/352; 428/354; 428/343; 156/215; 156/218; 156/289
[58] Field of Search ..................... 428/343, 352, 354; 156/215, 218, 289

[56] References Cited

U.S. PATENT DOCUMENTS

| | | |
|---|---|---|
| 1,726,744 | 9/1929 | Krug ............................... 428/261 X |
| 2,328,057 | 8/1943 | Coulter . |
| 2,822,290 | 2/1958 | Webber . |
| 2,914,167 | 11/1959 | Holtz . |
| 3,096,202 | 7/1963 | De Groot von Arx . |
| 3,342,675 | 9/1967 | Bouillenne-Wilrand et al. . |
| 3,581,884 | 6/1971 | Cladwell et al. . |
| 3,940,864 | 3/1976 | Kanzelberger . |
| 4,389,270 | 6/1983 | McClintock . |
| 4,443,783 | 4/1984 | Mitchell . |
| 4,704,315 | 11/1987 | McClintock .................... 428/343 X |
| 4,770,914 | 9/1988 | Torgerson et al. .............. 428/343 X |

FOREIGN PATENT DOCUMENTS

| | | |
|---|---|---|
| 2746502 | 6/1978 | Fed. Rep. of Germany . |
| 57-127473 | 8/1982 | Japan . |
| 1555808 | 11/1979 | United Kingdom . |

Primary Examiner—Jenna Davis
Assistant Examiner—D. R. Zirker
Attorney, Agent, or Firm—Young & Thompson

[57] ABSTRACT

A masking tape (10), for example for spray-painting, comprises a strip (11) of tearable material such as paper having an upper face, a lower face; a first pressure-sensitive adhesive layer (12) covering said lower face of said strip from one side edge thereof to the opposite side edge; a second pressure sensitive layer (13) applied to said upper face of said strip, said second layer having a longitudinal extent co-extensive with that of said strip and a transverse extent less than half that of said strip and being positioned close to one edge (11B) of said strip; and a release liner (14) covering said second adhesive layer. The masking tape is to be fixed to a surface to be painted in such a position that the free-edge (11A) of said strip forms a border to the area to be painted. The release liner is removed and a masking paper is fixed to said adhesive layer and cut clean along the inner edge thereof. The masking tape is manufactured according to the invention by laminating two tapes, one wider tape comprising a tearable strip with an adhesive layer on its lower face, and a narrower tape comprising a release liner and a releasable adhesive layer covering the lower face of the release liner and being securely attached to the upper face of the wider tape.

4 Claims, 2 Drawing Sheets

MASKING TAPE AND METHOD FOR MANUFACTURING ROLLS OF SUCH TAPE

The present invention relates to masking tapes to be used when painting an area of a supporting surface, for instance of a motor vehicle to be spray-painted, to provide a clearly defined border between the area to be painted and an area to be masked by the tape and a sheet of a masking paper secured to the masking tape.

Masking tapes for this purpose are available on the market under the trade name Scotch 233,3M ®, Armac TG6 ®, American Tape ®. In practice, the masking work is generally carried out as follows. The tape is secured one turn or length around the surface to be masked out. The surface is covered with a masking paper, which is first cut to a size at which one edge of the masking paper will lie on a portion of the upper face of the masking tape. This edge of the paper is then in position, by applying thereto a further length of masking tape from the same roll, this further length of tape being affixed to both the first length of tape and the interlying edge portion of the masking paper, while ensuring at the same time that the border edge of the first length of tape is left completely free.

The work involved as described is relatively time consuming and also requires the application of at least two turns or lengths of masking tape, and moreover, a certain professional skill. A further drawback is that adhesion of the second length of masking tape to the upper face of the first length of tape is relatively poor or weak, resulting in a relatively poor adhesive bond between the two tape lengths. This is due to the fact that the upper face of the masking tape has been treated so that it will form but a poor attachment with the adhesive on the lower face of the tape to facilitate the tape being rolled up. When the two lengths of tape are subjected to extra large forces, e.g. in those regions where the tape lengths extend around arcuate defining edge-surfaces, such as when masking-out the window glass of an automotive vehicle, the uppermost or second tape will often detach from the underlying first tape as a result of this relatively poor bond, therewith leaving a gap through which leakage can occur. Thus, when the vehicle is sprayed with paint, the paint is able to penetrate this leakage gap between the two lengths of tape and reach onto the surface to be protected, which in turn results in an unacceptable border and costly extra work.

There is also known a proposed masking tape disclosed in DE-A1-27 46 502, filed in 1977 and abandoned 1980, comprising a strip of tearable material which when being affixed with its lower face to a supporting surface by means of pressure sensitive self-adhesive will expose an area with a pressure sensitive adhesive on its upper ace which will enable a masking paper to be secured to this upper face and to clear out the paper so that the cut edge of the masking paper will be located on the upper face of the strip at a predetermined distance from the edge of the strip forming the border.

This publication discloses four embodiments of a masking tape of which three embodiments would not be accepted by professionals, because they provide a border edge of the tape which will not be tightly fixed to the support surface and thus may give rise to leakage and an inaccurate border. Only the fourth embodiment proposes a masking tape which might be operative provided it could be manufactured at a reasonable price and wound to a roll from which the masking tape could be unwound and fixed to the supporting surface in a conventional and comfortable way. However, the German publication is lacking any information whatsoever as to how to manufacture the tape and store it in a roll which could be handled in an easy way.

What is revealed in the German publication regarding the fourth embodiment is that it consists of a strip which has two narrow longitudinal areas of pressure sensitive adhesive, each area having a width which is less than half the width of the strip, one adhesive area being disposed edge to edge with one side edge of the strip on its upper face, whereas the other adhesive area is disposed edge to edge with the opposite side edge of the strip and on its lower face.

A practically identical masking tape is proposed in JP 57-127473. In this publication it is stated that this tape wound in rolls is convenient for practical use. Both adhesive areas on the upper and lower faces will adhere to the uncovered portions of the strip when the tape is wound to a roll. Therefore, the two adhesive areas have substantially the same adhesive properties relative to the strip faces. When unwinding such a roll to attach the strip to a support surface, it will be difficult to apply pressure on the strip with the thumb pressing on the free area of the upper face to provide pressure on the underlying adhesive areas on the lower face, without the thumb contacting the adhesive area on the upper face.

The object of the invention is therefore to provide a masking tape which may be manufactured at low cost and wound to a roll from which the tape can be unwound and affixed to a support surface as an ordinary tape used hitherto and having its lower face coated all over with a pressure sensitive self-adhesive, whereas the upper face of the tape all over has a surface which forms a smooth surface without tacky adhesive obstructing the thumb when it slides along the tape when unwinding the tape from its roll.

It is a further object of the invention to provide such a masking tape in which a covered adhesive layer on the upper face of the strip may have several times stronger adhesive capacity than the adhesive on the lower face of the strip to provide a strong connection with the masking paper when a covering release liner has been removed, enabling a safe removing of the strip together with the masking paper safely fixed to the strip, after having finished the painting work.

Still a further object of the invention is to provide a masking tape which has all of its lower face coated with a pressure sensitive adhesive to obtain a large adhesive area to enable the use of an adhesive with relatively low adhesive capacity which, however, still will be sufficient due to the relatively large area.

Still another object is to provide a masking tape which may be manufactured by means of simple devices from tapes available at low price on the market in order to reduce the manufacturing costs to a minimum.

According to the invention these objects are obtained by means of a masking tape which according to the invention comprises: a strip of tearable material such as paper having an upper face, a lower face, a transverse extent and a longitudinal extent greater than said transverse extent; a first pressure sensitive adhesive layer covering said lower face of said strip from one side edge thereof to the opposite side edge; a second pressure sensitive adhesive layer applied to said upper face of said strip, said second layer having a longitudinal extent coextensive with that of said strip and a transverse extent less than half that of said strip; and a release liner covering said second adhesive layer.

In a preferred embodiment said second adhesive layer has several times greater adhesive capacity than said first adhesive layer, and said second adhesive layer has a transverse extent about one-third that of said strip. The transverse extent is preferably about 15 mm, and said second adhesive layer preferably has a transverse extent of about 5 mm.

The upper face of a masking tape according to the invention will have a smooth upper face all over which in the corresponding tape roll will enable an easy unwinding of the tape held in one hand and enabling the thumb to press against the tape without contacting any adhesive, to conveniently attach the tape to the supporting surface.

In the roll, the turns of the tape according to the invention are adhered to each other rather weakly which facilitates unwinding the roll. This is due to the fact that the relatively weak adhesion between the turns is merely over the narrow area of the upper glossy face of the relatively narrow release liner being in contact with the adhesive layer on the adjacent lower face of the wider strip.

Lastly, the release liner is easily removed to expose the narrow adhesive layer secured to the upper face of the wide tape and preferably being rather aggressive to form a secure attachment of the masking paper.

After having removed the release liner easily and safely, the masking paper can be fixed to the exposed narrow adhesive layer, folded backwards on itself at the outer edge of the exposed adhesive layer and thereafter cut clean by means of a razor blade or similar tool. Since the strip is safely secured over its whole lower surface to the support surface, this cutting operation is easy to perform correctly.

The masking tape according to the invention may be manufactured at low cost according to a method which according to the invention is characterized in that a web of said tearable material having said first adhesive layer on its lower face is unwound and cut to a number of said wider strips to form wider tapes which, together with a narrower tape, are wound each on its core to form wider tape rolls, the narrower tape being unwound from a roll of said narrower tape which comprises said release liner having at its lower face an adhesive tape with adhesive on both sides or a corresponding adhesive layer releasable from said release liner, the narrower tape being fixed by means of its adhesive layer to the upper face of the respective wider strip in a predetermined position on its upper face to form a roll of said wider strip laminated with said narrower tape.

The web to be cut into wider strips may for example be the commercially available tape Scotch 233, 3M ®, Armac ® or American Tape ® and the narrower strip with the release liner may be PG6 American Tape ®, Fasson 239 ® or 3M950 ®. Accordingly, the components of the laminated masking tape are available at relatively low cost and the means for bringing the two tapes together are simple and efficient.

These and other features of the invention will be disclosed more in detail with reference to the accompanying drawings showing a preferred embodiment of a masking tape according to the invention and illustrating the method according to the invention for manufacturing the masking tape.

In the Figures there is illustrated an embodiment of a masking tape according to the invention and generally identified at 10. This tape consists of a wider strip 11 which is made of paper or some corresponding material of low tear strength such as to enable the tape, to be torn manually into desired lengths. The lower face of the strip 11 is coated, in a known manner, with a first self-adhesive layer 12 of the kind used with known masking tape of the type 3M ® or TESA ® or American Tape ®.

Figure 4:
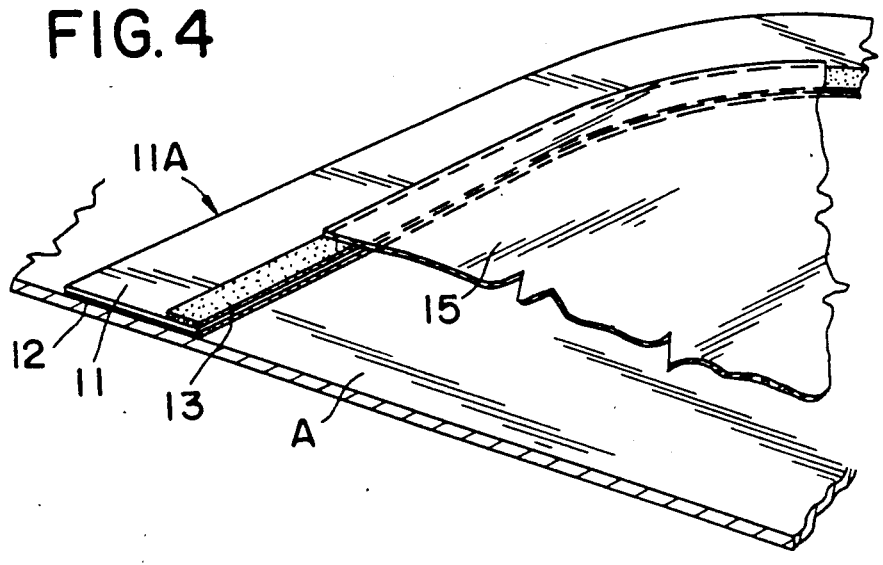
FIG. 4 is a schematic illustration in perspective, partly cut away, which shows how the masking paper can be held in the desired position with but a single length of the inventive masking tape.

On the upper face of the strip 11 is a second longitudinally extending narrow adhesive layer 13, the width of which is much smaller than the width of the strip 11, less than half the width of the tape, preferably about one third the width thereof. The strip 11 and its layer 12 has a narrow width of 15 mm in the embodiment shown, and the second layer 13 has a width of about 5 mm, which is highly beneficial when it is necessary to curve the tape and to attach the tape along an arcuate path, as indicated in FIG. 4. The adhesive used in the layer 13 may be similar to the layer 12 used to coat the lower face of the strip 11. However, it is preferred that the layer 13 has several times higher adhesive capacity than the layer 12.

In the illustrated embodiment, the adhesive layer 13 extends along and adjacent to one side edge 11B of the strip 11, thereby to leave a completely free, outer side edge 11A, the inner side-edge 13A of the adhesive layer 13 lying adjacent the inwardly side 11B of the strip 11, as shown in the drawing.

The adhesive layer 13 is covered with a protective strip or release liner 14 of paper or similar material, which can be readily torn-off manually so as to expose the adhesive layer 13. The free upper face of the strip 11 between the edge 11A and the inner edge 13B of the layer 13, and the upper face of the release liner strip 14 are coated with adhesive repellent coatings of known kinds, such as to obtain a smooth and rather glossy surface with a poor or weak attachment of the lower face of the strip to the upper face of the release liner when the tape is rolled up into its roll form. However, the adhesive layer 13 is firmly adhered to the upper face of the strip 11.

Figure 1:
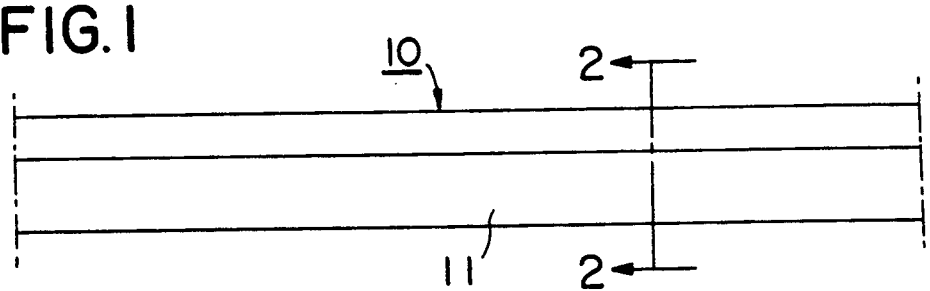
FIG. 1 illustrates the masking tape according to the invention seen from above.
Figure 2:
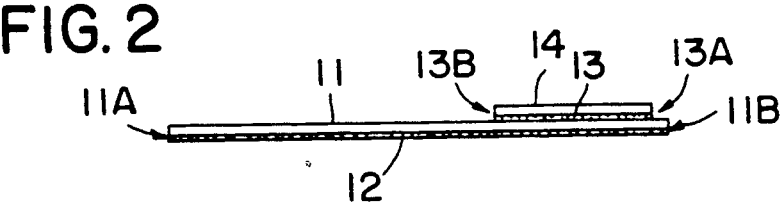
FIG. 2 is an enlarged cross-sectional view taken on the line 2—2 in FIG. 1.
Figure 3:
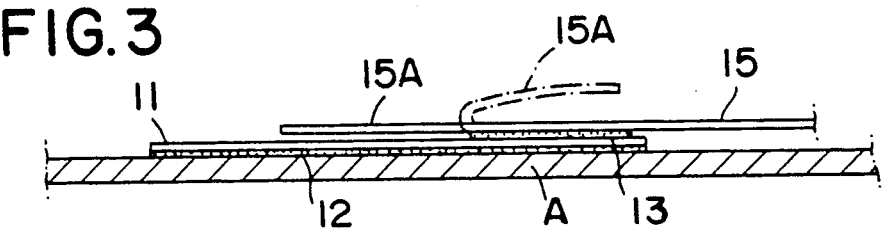
FIG. 3 illustrates the same cross-section subsequent to having fastened it to the support surface to be spray-painted up to the free edge of the tape, and subsequent to removing the release liner and firmly securing an edge portion of a masking paper to the narrow adhesive area exposed by removing the release liner.

FIGS. 3 and 4 illustrate the manner in which the inventive masking tape is used. The tape is unwound from a roll and pressed to the support surface A in a position where the free edge 11A of the strip 11 will form a sharp and clearly defined border relative to the surface to be spray-painted. For the sake of simplicity this surface A has been assumed to have the form of a metal sheet, although the masking tape is mostly fixed to a chromium strip or a rubber strip constituting a boundary of the surface which is not to be painted. The release liner 14 is removed, so as to expose the adhesive layer 13. The masking paper 15 is then pressed to the narrow adhesive layer 13. In this case, the edge part 15A of the masking paper has been folded back at a location adjacent the inner edge 13B of the layer 13, as indicated in FIG. 3, whereafter the protruding edge part 15A has been cut-off with the aid of a razor blade or some other sharp-edged tool capable of leaving a cleanly cut edge.

When using masking tape according to the present invention, the task of masking-out a surface can be effected quickly and reliably, since only one single length of masking tape need be placed and secured in position, and the masking paper may be fixed and cut, also by non-professionals.

The method of manufacturing rolls of the masking tape according to the invention is illustrated in FIGS. 5 to 10.

Basically, the masking tape is manufactured by laminating a known narrower tape strip with a known wider tape strip and winding the laminated tape to a roll. The narrower tape strip may be of the type Fasson 239 ® and the wider tape strip may be of the type American Tape ®.

Figure 5:
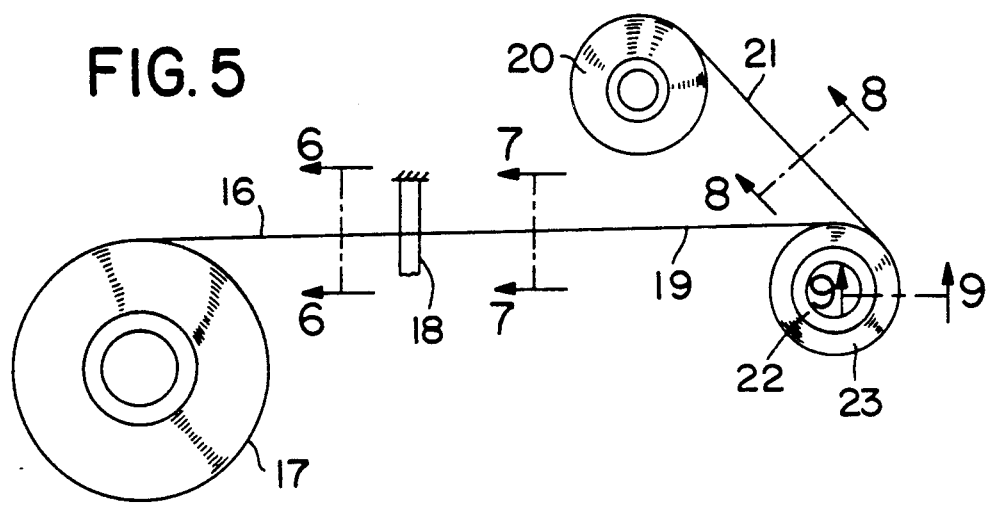
FIG. 5 is a diagrammatic side view of an apparatus for carrying out the method according to the invention.
Figure 6:
FIG. 6 is a section taken on the line 6—6 in FIG. 5.
Figure 7:
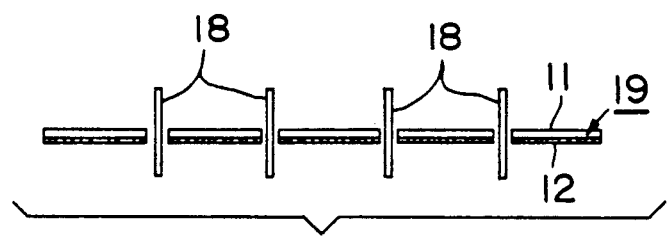
FIG. 7 is a section taken on the line 7—7 in FIG. 5 through five wide strips obtained by cutting the web in FIG. 6.
Figure 8:
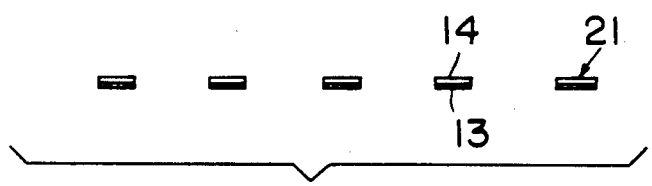
FIG. 8 is a section taken on the line 8—8 in FIG. 5 through five narrower tapes having a release liner which on its lower face has a releasable adhesive layer or tape with an adhesive on its both sides.
Figure 9:
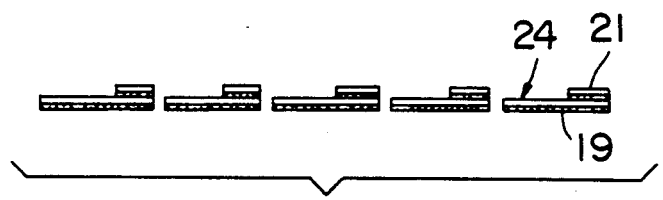
FIG. 9 is a section taken on the line 9—9 in FIG. 5 through one turn of the roll of the laminated masking tape.
Figure 10:
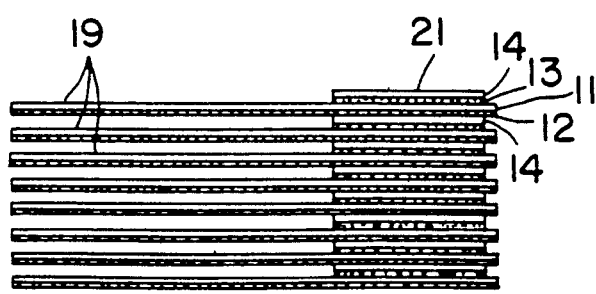
FIG. 10 is a cross-section through a number of turns of the roll on the line 9—9 in FIG. 5, on an enlarged scale.

As seen in FIG. 5 a web 16 is pulled from a storage roll 17 and by means of four knives 18 it is cut into five wider tape strips 19, each comprising a strip 11 of paper material having its lower face covered with a self-adhesive layer 12.

Above the strips 19 there are rotatably mounted five spaced rolls 20 of a narrower tape 21 which comprises a release liner 14 supporting on its lower face a releasable self-adhesive layer 13 or a corresponding film strip having a self-adhesive layer on both sides.

The strips 19 are wound on five cores 22 on a common rotatable shaft and in connection therewith each strip 19 is laminated with one of the narrower strips 21. As will be seen from FIG. 8 the narrow strips 21 are positioned substantially edge to edge with one side edge of respective wider strip 19. The adhesive layer 13 is preferably rather tacky to obtain a secure attachment to the upper face of the strips 11, that is the layer 13 should preferably have an adhesive capacity several times stronger than the layer 12. In the roll 23 formed by a number of turns of the laminated tape 24, the turns will adhere rather weakly to each other, as understood from FIG. 10, which means a rather small resistance to unwind the tape 24 from the roll 23.

The width of the narrower strips 21 is less than half the width of the wider strips 19, in the example shown about a third thereof. Therefore, only one third of the relatively weak adhesive layer 12 will be attached to the smooth and glossy upper face of the release liner 14 in the roll.

We claim:

1. In a masking tape comprising a strip (11) of tearable material having an upper face, a lower face, a transverse extent and a longitudinal extent greater than said transverse extent; the improvement wherein a first pressure sensitive adhesive layer (12) covers said lower face of said strip (11) from one side edge thereof to the opposite side edge, a second pressure sensitive adhesive layer (13) is applied to said upper face of said strip (11), said second layer having a longitudinal extent coextensive with that of said strip and a transverse extent less than half that of said strip (11), a release liner (14) covers said second adhesive layer (13), said second adhesive layer (13) with its release liner (14) divides said upper face of said strip (11) into a portion covered by said release liner and an exposed portion, said exposed portion comprising a release agent for said first adhesive layer (12), and said strip comprises first and second parallel opposite longitudinal edges (11B, 11A), said second adhesive layer (13) with its release liner (14) being applied to said strip (11) nearer said first edge (11B) than said second edge (11A), said second adhesive layer (13) having greater adhesive capacity per unit of area than said first adhesive layer (12).

2. Masking tape according to claim 1 wherein said second adhesive layer (13) has a transverse extent about one-third that of said strip (11).

3. Masking tape according to claim 2, wherein said strip (11) has a transverse extent of about 15 mm, and said second adhesive layer (13) with its release liner (14) has a transverse extent of about 5 mm.

4. A masking tape according to claim 1, wherein said second adhesive layer (13) is spaced from said first edge (11B) by a distance which is a minor portion of the width of said second adhesive layer (13).

* * * * *